United States Patent
Sjööquist

[11] Patent Number: 5,818,345
[45] Date of Patent: Oct. 6, 1998

[54] THEFT PROTECTION FOR ELECTRICALLY-POWERED ARTICLES

[75] Inventor: Peter Bertil Tom Sjööquist, Linköping, Sweden

[73] Assignee: ICL Systems AB, Kista, Sweden

[21] Appl. No.: 687,538
[22] PCT Filed: Dec. 1, 1995
[86] PCT No.: PCT/EP95/04806
  § 371 Date: Nov. 6, 1996
  § 102(e) Date: Nov. 6, 1996
[87] PCT Pub. No.: WO96/18175
  PCT Pub. Date: Jun. 13, 1996

[30] Foreign Application Priority Data

Dec. 3, 1994 [GB] United Kingdom ............ 9424474

[51] Int. Cl.[6] ............................................. G06F 7/04
[52] U.S. Cl. ............... 340/825.31; 340/571; 340/693
[58] Field of Search ............................. 340/568, 571, 340/693, 529, 530, 825.31, 825.32, 654; 307/64

[56] References Cited

U.S. PATENT DOCUMENTS

| 4,494,114 | 1/1985 | Kaish | 340/825.31 |
| 4,584,651 | 4/1986 | Carey, Jr. et al. | 364/483 |
| 4,806,926 | 2/1989 | Nakamura | 340/825.31 |
| 5,021,916 | 6/1991 | Hubbard | 340/825.31 X |
| 5,111,058 | 5/1992 | Martin | 307/66 |

FOREIGN PATENT DOCUMENTS

| 0 127 258 | 12/1984 | European Pat. Off. |
| 0 145 405 | 6/1985 | European Pat. Off. |
| 0 458 510 | 11/1991 | European Pat. Off. |

Primary Examiner—Thomas J. Mullen, Jr.
Attorney, Agent, or Firm—Lee, Mann, Smith, McWilliams, Sweeney & Ohlson

[57] ABSTRACT

A system and method for protecting an electrically-powered article, particularly a computer system such as a personal computer, from theft by rendering it effectively useless to anybody but the rightful user/owner. The personal computer includes a power disruption indicator (21) to which electrical power must be applied even when the computer is shut-down (switched off at switch 12). The continuous power is normally provided by means of a mains-supplied power unit (10). In the event of mains supply discontinuities longer than a predetermined short time period, as would be the case if the equipment is stolen, subsequent start-up of the computer is prevented until a theft protection password is provided by a potential user. A separate power source, such as a capacitor (20), is provided to power the power disruption indicator for shorter time periods, such as when moving the computer within premises, and thus obviate the need to enter the theft protection password upon such occasions.

8 Claims, 1 Drawing Sheet

THEFT PROTECTION FOR ELECTRICALLY-POWERED ARTICLES

BACKGROUND OF THE INVENTION

This invention relates to providing theft protection for electrically-powered articles, particularly computer systems such as personal computers, mainly from homes and small businesses, by making the article (personal computer) unusable by the thief.

In FIG. 1 of the accompanying drawings there is schematically shown a conventional personal computer. It includes a power supply unit (PSU) 10 which is connected by a plug 18 to a mains supply (not shown) and which supplies the whole computer with power when the mains switch 12 is closed i.e. the computer is switched on. A real time clock (RTC) 11 is powered from the PSU 10 when the computer is switched on by switch 12 or from a battery 13 when the computer is switched off at switch 12. Diodes 14 and 15 schematically show how the battery 13 is connected so that it only powers RTC 11 while the computer is switched off. The RTC 11 includes a flip-flop (not shown) which is set by the RTC when the RTC detects loss of power, for instance when the battery is flat. The central processing unit (CPU) 16 can read the output of the flip-flop and can thus update the RTC with the correct time when that is input by a user after power to the RTC has been lost. The CPU resets the flip-flop after the RTC has been updated. The system also includes a program store 17.

The use of passwords to prevent unauthorised use of computer systems is commonplace. However, password protection does not prevent theft, that is provide theft protection, as the password(s) can be disabled by either removing power to the RTC, i.e. removing or shorting the battery, or by shorting a jumper specially designed for this purpose. This type of password protection, furthermore, requests that the password be entered every time the system is started, which is unsuitable for theft protection.

Theft protection schemes which use a unique serial number that must be input every time the system is powered are common, for example, with car stereos, which must have the serial number input after every disconnection or replacement of the car's battery. The serial number is fixed and cannot be changed by the user. The serial number does not, however, provide protection against unauthorised use of the system once it is powered.

An object of the invention is to provide theft protection to computer systems, such as personal computer systems by making the system useless to anybody but the rightful owner. Preferably this should be achieved in such a manner that it does not impair the productivity of the rightful owner (user) by requesting user action, such as the inputting of passwords, when they are not needed.

SUMMARY OF THE INVENTION

According to one aspect of the present invention there is provided a method for protecting an electrically-powered article from theft, the article including an electrical element to which electrical power is required to be supplied even when the article is not in operation, the method including the steps of normally providing said power by means of a power supply external to the article; in the event of disconnection from the power supply, providing said power for up to a predetermined short time period from an alternative source within the article; providing means whereby the existence of a power discontinuity immediately following the expiry of the predetermined time period can be subsequently detected, and preventing operation of the article upon detection of a said power discontinuity until a correct theft protection password has been provided by a potential operator.

According to another aspect of the present invention there is provided a method of protecting a computer system from theft, the system including an element to which electrical power is required to be supplied even when the system is shut down, the method including the steps of: normally providing said power by a mains-supplied power unit; in the event of discontinuities in the mains supply providing said power for up to a predetermined short time interval from an alternative source within the system; detecting the occurrence of mains supply discontinuities longer than the predetermined time interval, and preventing start-up of the system subsequent to such an occurrence until a correct theft prevention password has been provided by a potential user.

According to a further aspect of the present invention there is provided a computer system provided with theft protection, the system including a mains-supplied power unit; an element to which electrical power is required to be supplied even when the system is shut down, the element being connected to said power unit and normally being powered thereby; means for supplying said power for a short predetermined time interval, in the event of mains supply discontinuities, being connected to the element; and including means for detecting the occurrence of mains supply discontinuities longer than the predetermined time interval and preventing start-up of the system subsequent to such an occurrence until a correct theft protection password has been provided by a potential user.

BRIEF DESCRIPTION OF THE DRAWINGS

Embodiments of the invention will now be described with reference to the accompanying drawings, in which.

DESCRIPTION OF THE PREFERRED EMBODIMENTS

Figure 1:
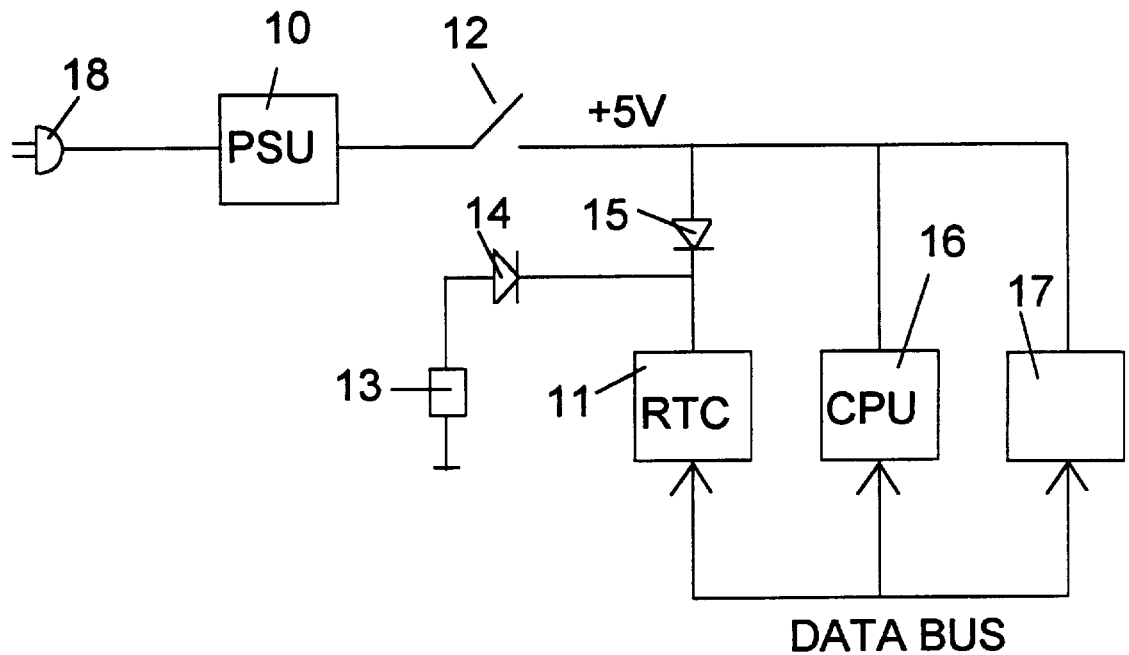
FIG. 1 illustrates, schematically, a conventional personal computer system.
Figure 2:
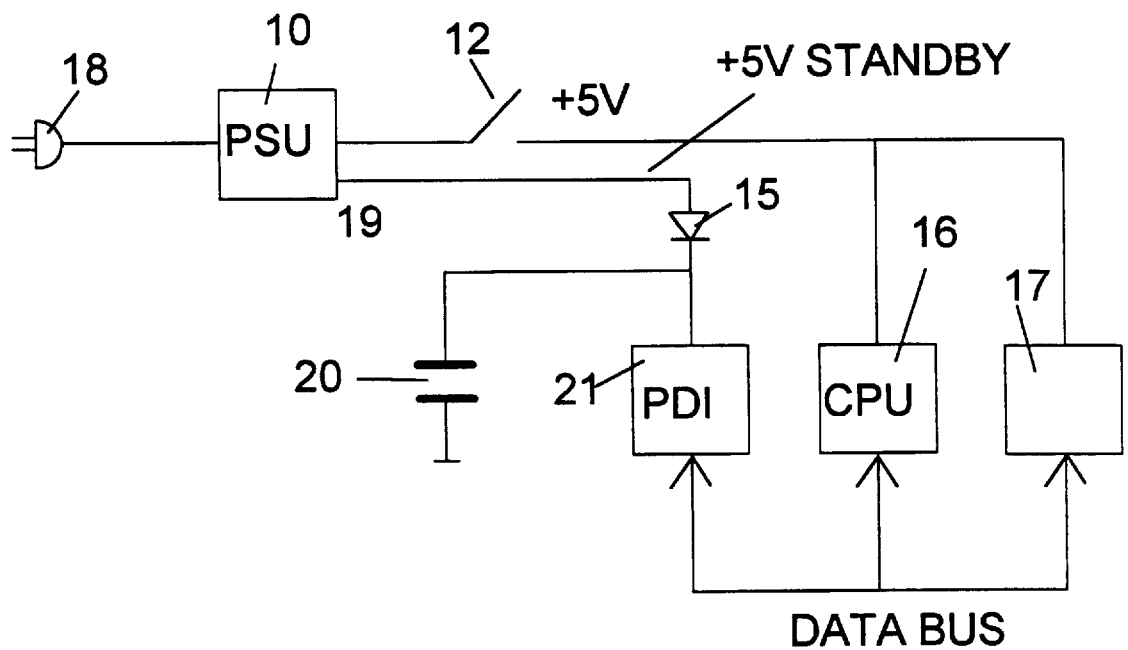
FIG. 2 illustrates, schematically, an embodiment of a personal computer system with theft protection implemented.

The system illustrated in FIG. 2 employs various components identical to those in the conventional arrangement of FIG. 1 and hence employs the same reference numerals. In particular it includes a plug 18, a PSU 10, a mains switch 12, a CPU 16 and a program store 17. Instead of RTC 11 there is illustrated a power disruption indicator 21 (PDI). This may be comprised by any simple or complex device which can detect a disruption in power and set a flip-flop (that can be reset by the host CPU 16) e.g. a simple state machine. The PDI includes the flip-flop (not shown). Typically the PDI can be the same circuit as already is used for indicating the state of the computer's 5 V front contact breaker, for handling the computer's operation of 110 and 220 V, etc., and for handling the PC when signals are coming from a serial port through a modem e.g. an incoming fax. The PDI could alternatively be an RTC. Diode 15 of FIG. 2 may, however, have a different rating to that of FIG. 1. The PSU 10 of FIG. 2 provides a +5 V stand-by power supply at port 19 which is independent of the main switch 12. The +5 V stand-by power is available whenever the system is connected to the mains supply by plug 18. The battery 13 of the conventional FIG. 1 arrangement is replaced by a capacitor 20 in the embodiment of FIG. 2. The capacitor 20 powers the PDI 21 for relatively short mains failures and for the time it takes to move the system within the premises, and is rated accordingly. Whenever the system is disconnected from the mains supply for a longer time, which could be the result of a theft, the CPU 18 is able to detect this by using the power lost flip-flop within the PDI. Another difference over the conventional system of FIG. 1 is that in the system of FIG. 2, the program store, which is non-volatile, contains a password for theft prevention.

When the system is reconnected to the mains after a short mains interruption and switched on by the user via mains switch 12, the CPU 16 will detect that the PDI has not lost power, due to the capacitor 20, and will thus not request the user to input the theft protection password.

If, however, the system has been disconnected from the mains supply for a longer time and then reconnected and switched on, the CPU 16 will detect, by reading the power lost flip-flop in the PDI, that the system has been disconnected and will therefore request that the user inputs the theft prevention password, effectively rendering the system useless for everybody except the legitimate owner. The owner of the system has the possibility, using a set-up program, to change the theft prevention password or to disable theft prevention completely.

A typical post start-up sequence to implement theft protection could be as follows:

```
PowerOn:
InitializeKeyboardAndDisplay ();
if(PDIHasLostPower) {
    if (TheftProtectionEnabled) {
        /* Do not return until a correct
           password has been entered
        */
        RequestAndCheckAdminPassword ();
    }
    /* Clear PowerLost status of PDI*/
    Initialize PDI ();
}
/* Normal start-up sequence follows here */
```

As will be appreciated from the above, the invention uses a novel method of powering the PDI together with a password stored in a non-volatile memory 17 and a special start-up program to achieve theft prevention/protection. The same password can also be used to prevent unauthorised use of the system, if desired. If there has been no detectable power loss, the theft protection password is not required to be entered at start-up. Theft prevention is thus provided for a computer system by using standard components together with other readily available components and appropriate software. Whilst powering of the PDI is referred to above, the invention could equally be applied to powering of any other element which requires a continuous supply, even when the computer is shutdown/switched off. Furthermore, the basic principle of detecting when a powered unit is disconnected from a power source for more than a short time period, and in that case requiring the input of a "password" before it can be made to work again, can be applied to other electrically powered articles than personal computers, for example TV receivers and VCRs. The theft prevention password may in this case comprise a code number rather than involving letters as implied by a password. The latter may of course involve letters, numerals and other elements.

In general terms, the invention thus protects an electronically-powered article (computer system) from theft, the article including an element which requires power at all times, but only very little current. This power is normally supplied by a mains or battery supply unit external to the article. If that supply unit is disconnected for longer than a short predetermined time period, the power is supplied from an alternative source within the article for up to the short predetermined time period. After that time, if the supply unit has not already been reconnected, it will not be possible to use the article unless a correct theft protection password is inserted by a potential user, due to "tripping" of an element within the article which can only be reset as a result of a correct password being entered.

I claim:

1. A computer system provided with theft protection, the system including:

a power supply unit with an input connectible to a mains supply and with first and second outputs, the first output being coupled to at least a central processing unit of the computer system via a mains switch and providing power to said central processing unit when the mains switch is closed and the power supply unit is connected to the mains supply, and the second output being coupled to a power disruption indicator and providing power thereto independently of the switching state of the mains switch when the power supply unit is connected to the mains supply;

auxiliary power supply means connected to said power disruption indicator, said auxiliary power supply means being capable of supplying power to the power disruption indicator for only a predetermined short time interval and being used to supply power to the power disruption indicator only in the event of mains supply discontinuities, wherein it serves to prevent the power disruption indicator from indicating the occurrence of a power disruption of a duration less than the predetermined short time interval;

wherein the central processing unit, in response to the indication of a power disruption of a duration longer than the predetermined short time interval, prevents start-up of the system until a password corresponding to a theft protection password stored in the system has been entered by a potential user;

and wherein the short time interval is of a length consistent with acts comprising relatively short mains failures and moving the system within premises, whereby such acts can take place without the need for input of the theft protection password.

2. A system as claimed in claim 1, wherein the power disruption indicator sets a flip-flop upon the occurrence of a power disruption longer than the predetermined short interval, and wherein the central processing unit requests input of the theft protection password when it detects that the flip-flop is set upon start-up of the system.

3. A system as claimed in claim 1 and including a non-volatile memory in which the theft protection password is stored.

4. A system as claimed in claim 1 and wherein the auxiliary power supply means is a capacitor chargeable by the second output of the power supply unit.

5. A method of protecting a computer system from theft, the system including a power supply unit with an input connectible to a mains supply and with first and second outputs, the first output being coupled to at least a central processing unit of the computer system via a mains switch and providing power to said central processing unit when the mains switch is closed and the power supply unit is connected to the mains supply, and the second output being coupled to a power disruption indicator and providing power thereto independently of the switching state of the mains switch when the power supply unit is connected to the mains supply, the method including the steps of:

normally powering the power disruption indicator by the second output of the power supply unit;

connecting an auxiliary power supply means to said power disruption indicator, said auxiliary power supply means being capable of supplying power to the power disruption indicator for only a predetermined short time interval;

in the event of mains supply discontinuities, supplying power to said power disruption indicator from said auxiliary power supply means, and thereby preventing the power disruption indicator from indicating the occurrence of a power disruption of a duration less that the predetermined short time interval;

indicating the occurrence of a power disruption of a duration longer than the predetermined time interval by means of the power disruption indicator; and in the event of the power disruption indicator indicating a power disruption, preventing start-up of the computer system until a password corresponding to a theft protection password stored in the system has been entered by a potential user, the preventing step being carried out by the central processing unit;

and wherein the short time interval is chosen to be of a length consistent with acts comprising relatively short mains failures and moving the system within premises, whereby such acts can take place without the need for input of the theft protection password.

6. A method as claimed in claim 5, wherein the indicating step comprises setting a flip-flop, and wherein the step of preventing start-up comprises causing the central processing unit to read the state of the flip-flop and in the event of the flip-flop being set requesting the insertion of the theft prevention password.

7. A method as claimed in claim 5 and including the step of storing the theft protection password in a non-volatile memory.

8. A method as claimed in claim 5 and wherein the auxiliary power supply means is a capacitor chargeable by the second output of the power supply unit.

* * * * *